(12) United States Patent
Petro et al.

(10) Patent No.: US 7,719,159 B2
(45) Date of Patent: *May 18, 2010

(54) APPARATUS AND METHOD FOR CONSTRUCTING ELECTRODYNAMIC MACHINES

(75) Inventors: John Patrick Petro, Los Altos, CA (US); Ken George Wasson, Foster City, CA (US); Jeremy Franz Mayer, Santa Clara, CA (US)

(73) Assignee: Novatorque, Inc., North Highlands, CA (US)

( * ) Notice: Subject to any disclaimer, the term of this patent is extended or adjusted under 35 U.S.C. 154(b) by 446 days.

This patent is subject to a terminal disclaimer.

(21) Appl. No.: 11/538,750

(22) Filed: Oct. 4, 2006

(65) Prior Publication Data

US 2007/0126303 A1 Jun. 7, 2007

Related U.S. Application Data

(60) Provisional application No. 60/724,062, filed on Oct. 5, 2005, provisional application No. 60/724,055, filed on Oct. 5, 2005, provisional application No. 60/724,053, filed on Oct. 5, 2005.

(51) Int. Cl.
*H02K 1/12* (2006.01)
(52) U.S. Cl. ................................................. 310/258
(58) Field of Classification Search ............... 310/258, 310/254, 216
See application file for complete search history.

(56) References Cited

U.S. PATENT DOCUMENTS

| 4,594,522 | A |   | 6/1986 | Fujiwara et al. |
| 5,004,940 | A | * | 4/1991 | Vanderlaan .................. 310/36 |
| 5,205,721 | A |   | 4/1993 | Isaacson |
| 5,606,209 | A | * | 2/1997 | Jacobsen et al. ............. 310/82 |
| 6,286,199 | B1 | * | 9/2001 | Bobay et al. .................. 29/596 |
| 6,841,908 | B2 | * | 1/2005 | Hasegawa et al. .......... 310/90.5 |
| 7,061,152 | B2 | * | 6/2006 | Petro et al. ............. 310/156.38 |
| 2003/0227229 | A1 | * | 12/2003 | Fiorenza et al. ............. 310/184 |

* cited by examiner

*Primary Examiner*—Nguyen N Hanh
(74) *Attorney, Agent, or Firm*—Cooley Godward Kronish LLP

(57) ABSTRACT

A method, apparatus and system producing for electrodynamic machinery are disclosed. In one embodiment, an integrated stator-housing structure for constructing electrodynamic machines includes one or more field pole members. Each field pole member can have a first pole face and a second pole face. Also, the members each can have a field pole core being configured to produce a flux path in a direction from the first pole face to the second pole face. In one embodiment, the integrated stator-housing structure can also include a housing structure configured to support the one or more field pole members. The housing structure is configured to mate with one or more other housing structures to form an enclosure of an electrodynamic machine. In another embodiment, the housing structure is composed of potting compound formed with the one or more field pole members in, for example, a mold. In this case, the integrated stator-housing structure includes the potting compound and the field pole members. In a specific embodiment, the flux path is straight from the first pole face to the second pole face.

6 Claims, 9 Drawing Sheets

APPARATUS AND METHOD FOR CONSTRUCTING ELECTRODYNAMIC MACHINES

CROSS REFERENCE TO RELATED APPLICATIONS

This application claims the benefit of U.S. Provisional Application No. 60/724,062, entitled "Integrated Stator-Housing Structure for Constructing Electrodynamic Machines," filed Oct. 5, 2005, the contents of which are hereby incorporated by reference in their entirety.

This application incorporates by reference the following documents in their entirety for all purposes: (1) U.S. Pat. No. 7,061,152, entitled "Rotor-Stator Structure for Electrodynamic Machines"; (2) U.S. Provisional Application No. 60/724,055, entitled "Commutation of Brushless Electrodynamic Machines," filed on Oct. 5, 2005; and (3) U.S. Provisional Application Ser. No. 60/724,053, entitled "Motor Module for Linear and Rotary Motors," filed on Oct. 5, 2005.

BRIEF DESCRIPTION OF THE INVENTION

This invention relates generally to electric motors, alternators, generators and the like, and more particularly, to housing structures including embedded field pole members as subassemblies for constructing electrodynamic machines.

BACKGROUND OF THE INVENTION

Traditional motor and generator structures are usually designed to accommodate rotor assemblies having relatively large spinning diameters located near the axial center of the rotor. Further, the techniques for manufacturing conventional motors typically require assembly of their components in an axial manner. FIGS. 1 and 2 depict the axial assembly of components for typical motor structures.

FIG. 1 illustrates commonly-used motor components and assembly techniques for a traditional brushed direct current ("DC") electric motor. Brushed DC electric motor 100 includes an end plate 102, a rotor assembly 104, and a housing 106. End plate 102 includes brushes 101 to make and break contact with commutation segments on commutator 103, thereby commutating power to a rotor assembly 104. The rotor assembly also includes a shaft 105 and windings 107. Housing 106 is deep-drawn (i.e., it has been formed to have a deep housing cavity) and is configured to capture a first bearing (not shown) and one end of the shaft 105. Note that housing 106 can provide datum surfaces to locate and align end plate 102. End plate 102 is configured to capture a second bearing (not shown) and the other end of shaft 105. To assemble brushed DC electric motor 100, rotor assembly 104 is axially inserted into housing 106, with end plate 102 subsequently being secured to housing 106.

FIG. 2 illustrates commonly-used motor components and assembly techniques for a traditional brushless direct current ("DC") electric motor. Brushless DC electric motor 200 includes a first plate 208, a yoke 206 composed of laminations, a rotor assembly 204, and a second plate 202. Laminated yoke 206 supports coils (not shown) and provides a mounting surface for joining first plate 208 with second plate 202. To assemble brushless DC electric motor 200, rotor assembly 204 is inserted axially through the center of laminated yoke 206. Then, first plate 208 is positioned and secured with second plate 202.

While functional, the assembly techniques used to produce motors 100 and 200 are generally suboptimal for motors that have rotors with relatively small spinning diameters near their axial centers and relatively large spinning diameters near their ends.

In view of the foregoing, it would be desirable to provide improved assembly techniques for motors that have rotors with relatively small spinning diameters near their axial centers and relatively large spinning diameters near their ends.

SUMMARY OF THE INVENTION

A method, apparatus and system for producing electrodynamic machinery are disclosed. In one embodiment, an integrated stator-housing structure for constructing electrodynamic machines includes one or more field pole members. Each field pole member can have a first pole face and a second pole face. Also, the members each can have a field pole core being configured to produce a flux path in a direction from the first pole face to the second pole face. In one embodiment, the integrated stator-housing structure can also include a housing structure configured to support the one or more field pole members. The housing structure is configured to mate with one or more other housing structures to form an enclosure of an electrodynamic machine. In another embodiment, the housing structure is composed of potting compound formed with the one or more field pole members in, for example, a mold. In this case, the integrated stator-housing structure includes the potting compound and the field pole members. In a specific embodiment, the flux path is straight from the first pole face to the second pole face.

BRIEF DESCRIPTION OF THE FIGURES

The invention is more fully appreciated in connection with the following detailed description taken in conjunction with the accompanying drawings, in which.

DETAILED DESCRIPTION OF EXEMPLARY EMBODIMENTS

Definitions

Figure 1:
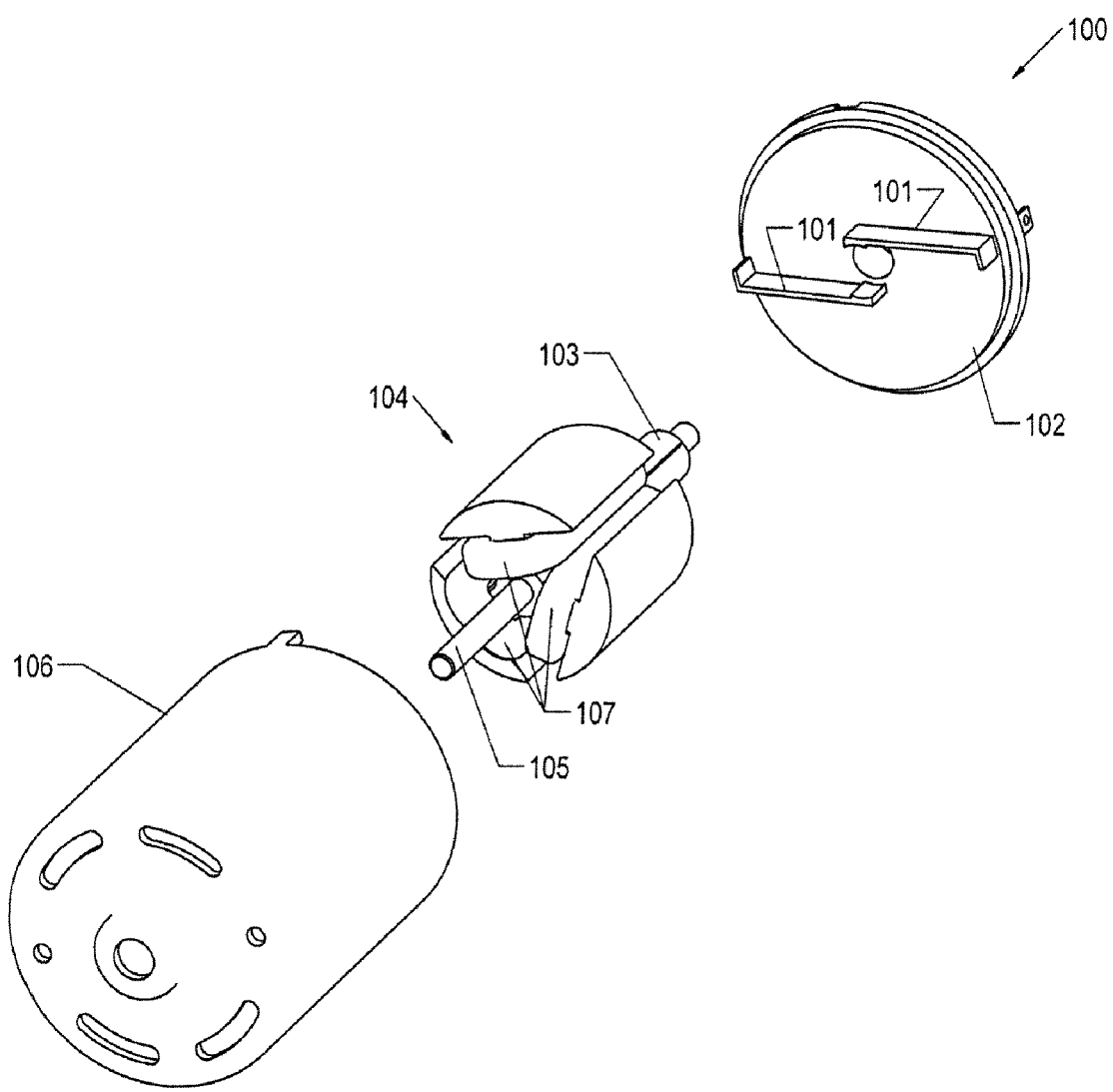
FIGS. 1 and 2 exemplify motor components and assembly techniques used in accordance with the prior art.
Figure 2:
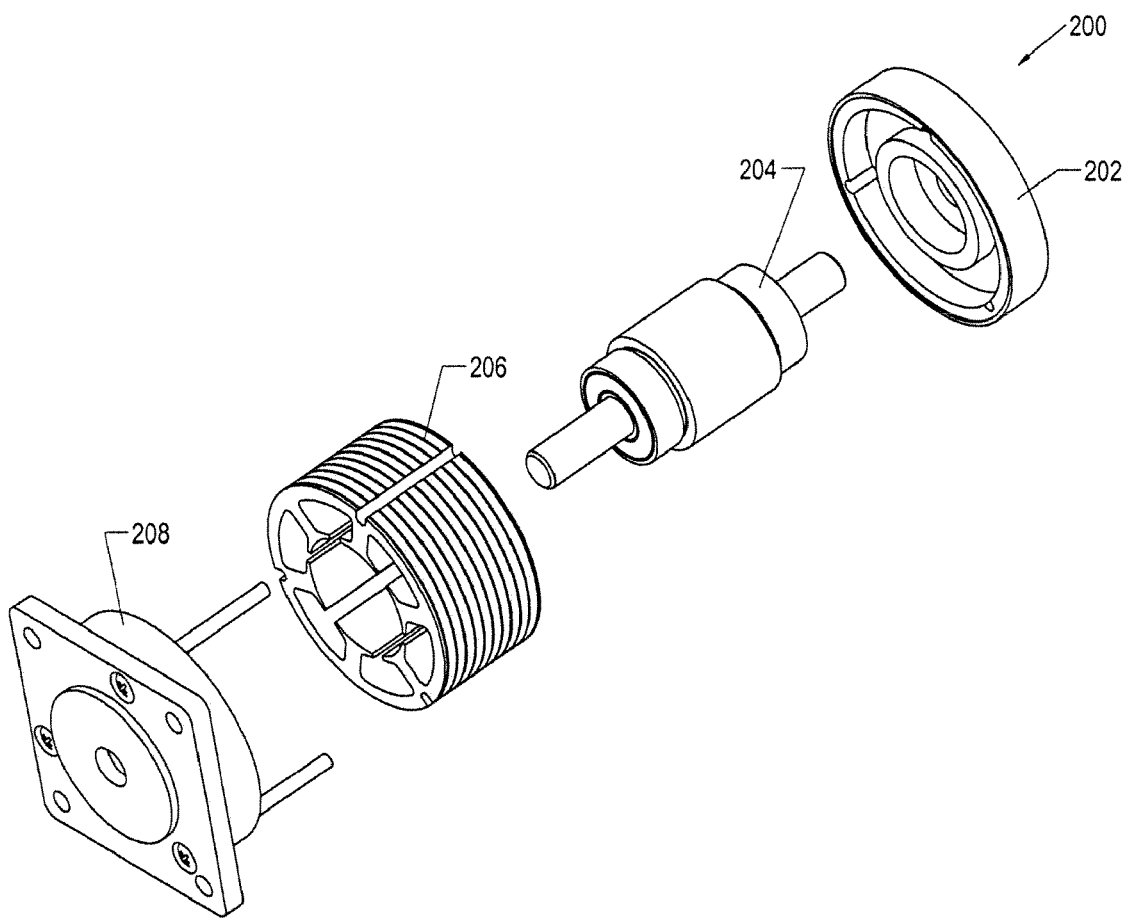

The following definitions apply to some of the elements described with respect to some embodiments of the invention. These definitions may likewise be expanded upon herein.

As used herein, the term "air gap" refers to a space, or a gap, between a magnet surface and a confronting pole face. Such a space can be physically described as a volume bounded at least by the areas of the magnet surface and the pole face. An air gap functions to enable relative rotation between a rotor and a stator, and to define a flux interaction region. Although an air gap is typically filled with air, it need not be so limiting.

As used herein, the term "back-iron" commonly describes a physical structure (as well as the materials giving rise to that physical structure) that is often used to complete an otherwise open magnetic circuit. In particular, back-iron structures are generally used only to transfer magnetic flux from one magnetic circuit element to another, such as either from one magnetically permeable field pole member to another, or from a magnet pole of a first magnet to a magnet pole of a second magnet, or both, without an intervening ampere-turn generating element, such as a coil, between the field pole members or the magnet poles. Furthermore, back-iron structures are not generally formed to accept an associated ampere-turn generating element, such as one or more coils.

As used herein, the term "coil" refers to an assemblage of successive convolutions of a conductor arranged to inductively couple to a magnetically permeable material to produce magnetic flux. In some embodiments, the term "coil" can be described as a "winding" or a "coil winding." The term "coil" also includes foil coils (i.e., planar-shaped conductors that are relatively flat).

As used herein, the term "coil region" refers generally to a portion of a field pole member around which a coil is wound.

As used herein, the term "core" refers to a portion of a field pole member where a coil is normally disposed between pole shoes and is generally composed of a magnetically permeable material for providing a part of a magnetic flux path.

As used herein, the term "field pole member" refers generally to an element composed of a magnetically permeable material and being configured to provide a structure around which a coil can be wound (i.e., the element is configured to receive a coil for purposes of generating magnetic flux). In particular, a field pole member includes a core (i.e., core region) and at least one pole shoe, each of which is generally located near a respective end of the core. Without more, a field pole member is not configured to generate ampere-turn flux. In some embodiments, the term "field pole member" can be described generally as a "stator-core."

As used herein, the term "active field pole member" refers to an assemblage of a core, one or more coils, and at least one pole shoe. In particular, an active field pole member can be described as a field pole member assembled with one or more coils for selectably generating ampere-turn flux. In some embodiments, the term "active field pole member" can be described generally as a "stator-core member."

As used herein, the term "ferromagnetic material" refers to a material that generally exhibits hysteresis phenomena and whose permeability is dependent on the magnetizing force. Also, the term "ferromagnetic material" can also refer to a magnetically permeable material whose relative permeability is greater than unity and depends upon the magnetizing force.

As used herein, the term "field interaction region" refers to a region where the magnetic flux developed from two or more sources interact vectorially in a manner that can produce mechanical force and/or torque relative to those sources. Generally, the term "flux interaction region" can be used interchangeably with the term "field interaction region." Examples of such sources include field pole members, active field pole members, and/or magnets, or portions thereof. Although a field interaction region is often referred to in rotating machinery parlance as an "air gap," a field interaction region is a broader term that describes a region in which magnetic flux from two or more sources interact vectorially to produce mechanical force and/or torque relative to those sources, and therefore is not limited to the definition of an air gap (i.e., not confined to a volume defined by the areas of the magnet surface and the pole face and planes extending from the peripheries between the two areas). For example, a field interaction region (or at least a portion thereof) can be located internal to a magnet.

As used herein, the term "generator" generally refers to an electrodynamic machine that is configured to convert mechanical energy into electrical energy regardless of, for example, its output voltage waveform. As an "alternator" can be defined similarly, the term generator includes alternators in its definition.

As used herein, the term "magnet" refers to a body that produces a magnetic field externally unto itself. As such, the term magnet includes permanent magnets, electromagnets, and the like.

As used herein, the term "motor" generally refers to an electrodynamic machine that is configured to convert electrical energy into mechanical energy.

As used herein, the term "magnetically permeable" is a descriptive term that generally refers to those materials having a magnetically definable relationship between flux density ("B") and applied magnetic field ("H"). Further, "magnetically permeable" is intended to be a broad term that includes, without limitation, ferromagnetic materials, powder metals, soft magnetic composites ("SMCs"), and the like.

As used herein, the term "pole face" refers to a surface of a pole shoe that faces at least a portion of the flux interaction region (as well as the air gap), thereby forming one boundary of the flux interaction region (as well as the air gap). In some embodiments, the term "pole face" can be described generally as a "stator surface" or at least a portion of a "flux interaction surface," or both.

As used herein, the term "pole shoe" refers to that portion of a field pole member that facilitates positioning a pole face so that it confronts a rotor (or a portion thereof), thereby serving to shape the air gap and control its reluctance. The pole shoes of a field pole member are generally located near each end of the core starting at or near a coil region and terminating at the pole face. In some embodiments, the term "pole shoe" can be described generally as a "stator region."

As used herein, the term "soft magnetic composites" ("SMCs") refers to those materials that are comprised, in part, of insulated magnetic particles, such as insulation-coated ferrous powder metal materials that can be molded to form an element of the stator structure of the present invention.

Discussion

Figure 3A:
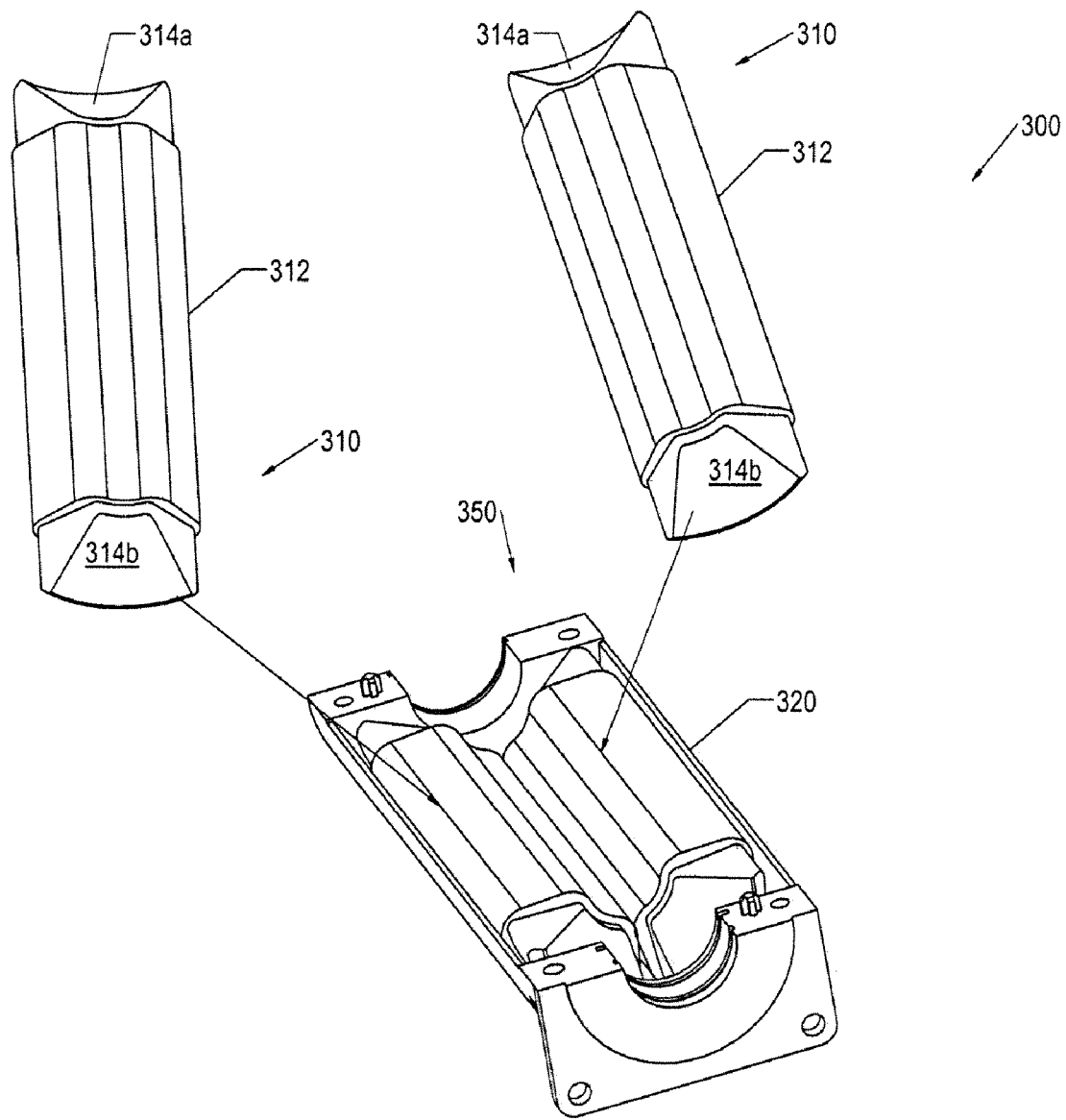
FIGS. 3A and 3B are diagrams depicting the formation of an integrated stator-housing structure as a subassembly for constructing electrodynamic machines in accordance with various embodiments of the invention.

FIG. 3A is a diagram 300 depicting the formation of an integrated stator-housing structure as a subassembly for constructing electrodynamic machines in accordance with one embodiment of the invention. Specifically, any number of active field pole members 310 are integrated with a housing structure 320 to form integrated stator-housing structure 350. By forming this subassembly, integrated stator-housing structure 350 advantageously reduces the complexity of finally assembling an electrodynamic machine by decreasing the number of components. For example, integrated stator-housing structure 350 can be combined with a rotor and one or more other integrated stator-housing structures to form either an electric motor or a generator during a final assembly process.

One or more of active field pole members 310 are configured to provide a stator structure and/or functionality. As shown, active field pole members 310 include one or more conductors 312 wound about each of the field pole members at, for example, the field pole core. Conductors 312 can be any kind of current-carrying structure, such as a wire or a foil coil. Conductors 312 are disposed (e.g., wound) about the periphery of the constituent field pole members. The periphery includes the surfaces of active field pole members 310 at or near the field pole core (not shown). While FIG. 3A shows two active field pole members 310 being used, any number of active field pole members can be used. In at least one embodiment, one or more of active field pole members 310 can be field pole members (i.e., without conductors 312). Further, one or more field pole members 310 are shown to each have a first pole face 314a and a second pole face 314b. Each field pole member 310 has a field pole core (not shown) being configured to produce a flux path in a direction from a first pole face to the second pole face. In a specific embodiment, the flux path is straight from the first pole face to the second pole face. In one embodiment, there is only one pole face if the final assembly process produces a single magnet-based electrodynamic machine. While FIG. 3A depicts pole faces 314 as being contoured to confront a conical magnet, they also can be contoured to confront other magnets shapes, such as cylindrical magnets, according to various embodiments of the invention.

Housing structure 320 can be configured to support active field pole members 310 during the sub-assembly process to position at least a portion of a first pole face and at least a portion of a second pole face to each confront a conical magnet at a predetermined distance. Generally this predetermined distance provides for the dimensioning of one or more air gaps. But in at least in one specific embodiment, the subassembly process positions the first and second pole faces to confront cylindrical magnets. In one embodiment, integrated stator-housing structure 350 can further include an adhesive to rigidly affix active field pole members 310 to housing structure 320 and/or to encapsulate active field pole members 310 within housing structure 320. An example of a suitable adhesive is any type of potting compound commonly used in motor manufacturing processes. In one embodiment, the potting compound is an epoxy. In one or more embodiments, housing structure 320 is configured to mate with one or more other housing structures to form an enclosure. As used herein, the term "enclosure" refers in some embodiments to a structure that shields the inner components of a motor or generator from the environment. As described next, an enclosure can be composed of potting compound encapsulating active field pole members.

Figure 3B:
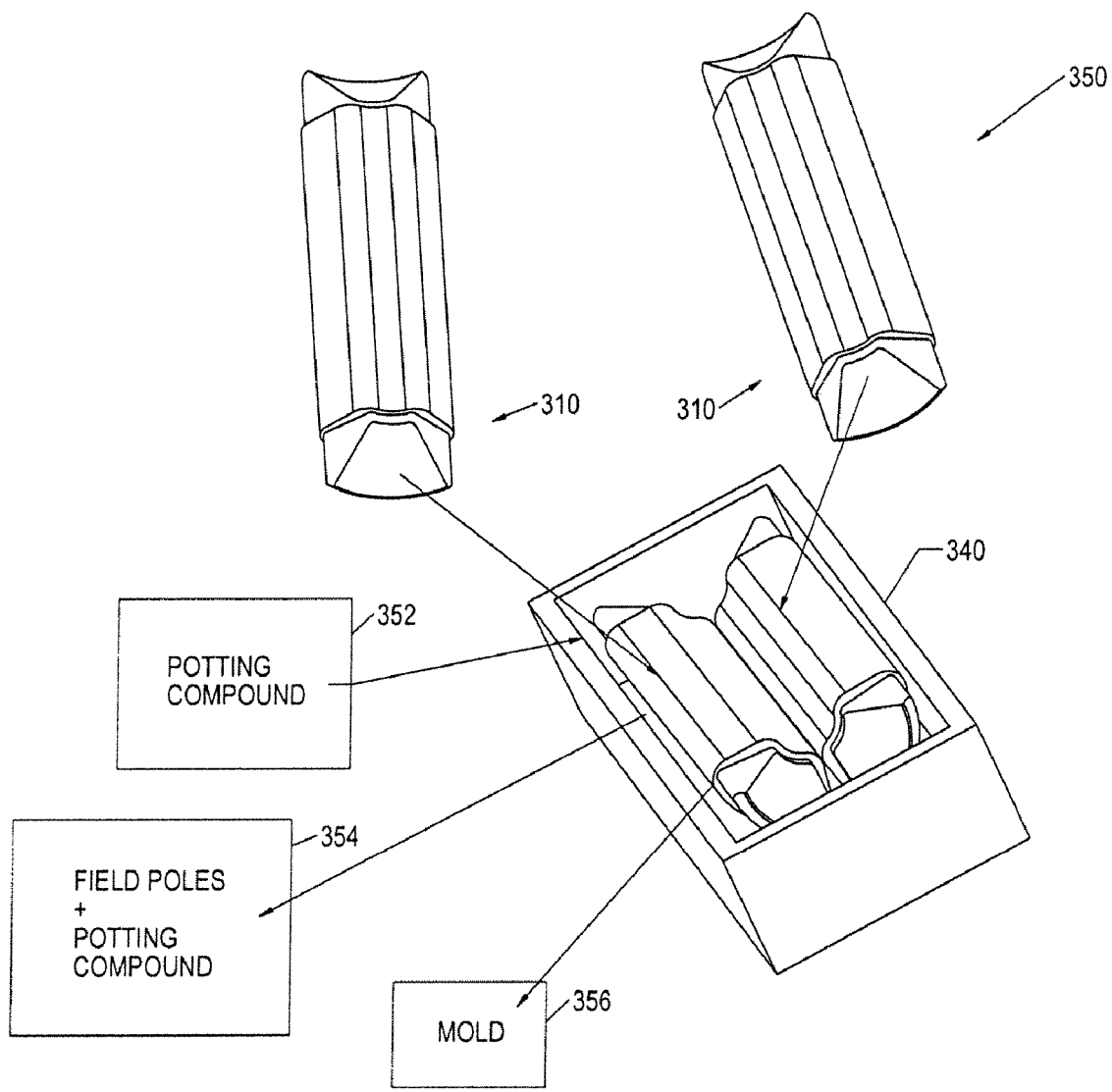

FIG. 3B is a diagram 350 depicting the formation of another integrated stator-housing structure as a subassembly in accordance with another embodiment of the invention. Specifically, any number of active field pole members 310 can be integrated with a potting compound 352 to form an integrated stator-housing structure 354. Advantageously, potting compound 352 itself forms a housing structure as an enclosure, thereby obviating a requirement for a separate housing structure, such as housing structure 320 of FIG. 3A. To manufacture integrated stator-housing structure 354, FIG. 3B shows active field pole members 310 being disposed into a mold 340 into which potting compound 352 is also inserted. Generally, potting compound 352 is formed to substantially encapsulate at least the exterior-facing sides of active field pole members 310 to provide a protective barrier. Once integrated stator-housing structure 354 is formed, it is separated from mold 356.

Figure 4:
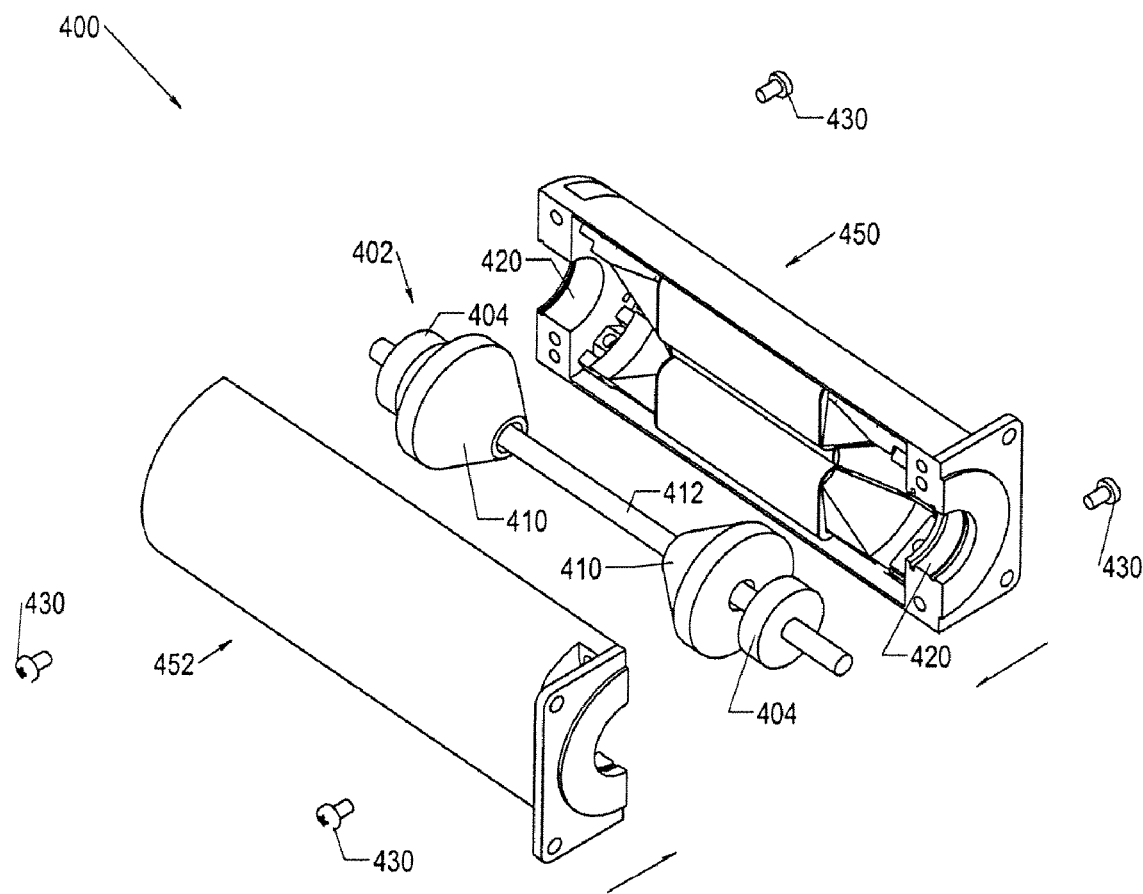
FIG. 4 illustrates the formation of an electrodynamic machine, according to one embodiment of the invention.

FIG. 4 illustrates the formation of an electrodynamic machine, according to one embodiment of the invention. FIG. 4 depicts the formation of electrodynamic machine 400 by joining at least two integrated stator-housing structures during, for example, a final assembly process. Once assembled, electrodynamic machine 400 includes two "half-shell" subassemblies: integrated stator-housing structure 450 and integrated stator-housing structure 452, both of which can have similar functionalities and/or structures as that of FIG. 3A or 3B. Electrodynamic machine 400 also includes rotor 402 having magnets positioned on a shaft 412 at or near the pole faces of the field pole members embedded in integrated stator-housing structures 450 and 452. In this example, rotor 402 includes bearings 404 and conical magnets 410. In one embodiment, integrated stator-housing structures 450 and 452 each include a portion 420 of a groove at each end to receive a portion of a respective bearing 404. So when integrated stator-housing structures 450 and 452 are integrated to torn-electrodynamic machine 400 and its enclosure, bearings 404 reside in a groove composed of portions 420 of that groove. In one embodiment, integrated stator-housing structures 450 and 452 each include fastening means to couple them together to form an enclosure for electrodynamic machine 400. For example, screws 430 can provide such a fastening means. In other embodiments, the fastening means can provide for snap-fitting at final assembly. In a specific embodiment, the active field pole members of integrated stator-housing structures 450 and 452 each further comprises a coil having a first conductor end and a second conductor end, both of which can be located external to the enclosure.

In a specific embodiment, integrated stator-housing structures 450 and 452 include two housing structures each forming one-half of an enclosure. Further, each of integrated stator-housing structures 450 and 452 can include two field pole members. But in various embodiments, each of integrated stator-housing structures 450 and 452 can include any number of field pole members. In an alternative embodiment, electrodynamic machine 400 can include more than two housing structures and/or integrated stator-housing structures. For example, electrodynamic machine 400 can include four "quarter-shells" or integrated stator-housing structures. Or in another embodiment, electrodynamic machine 400 can include two integrated stator-housing structures 450 and 452 of different sizes (i.e., each supporting different numbers of field pole members). While integrated stator-housing structure 450 and integrated stator-housing structure 452 are shown to include a housing structure 320 of FIG. 3A, other embodiments can exclude housing structure 320 if a potting compound is substituted therewith.

Figure 5A:
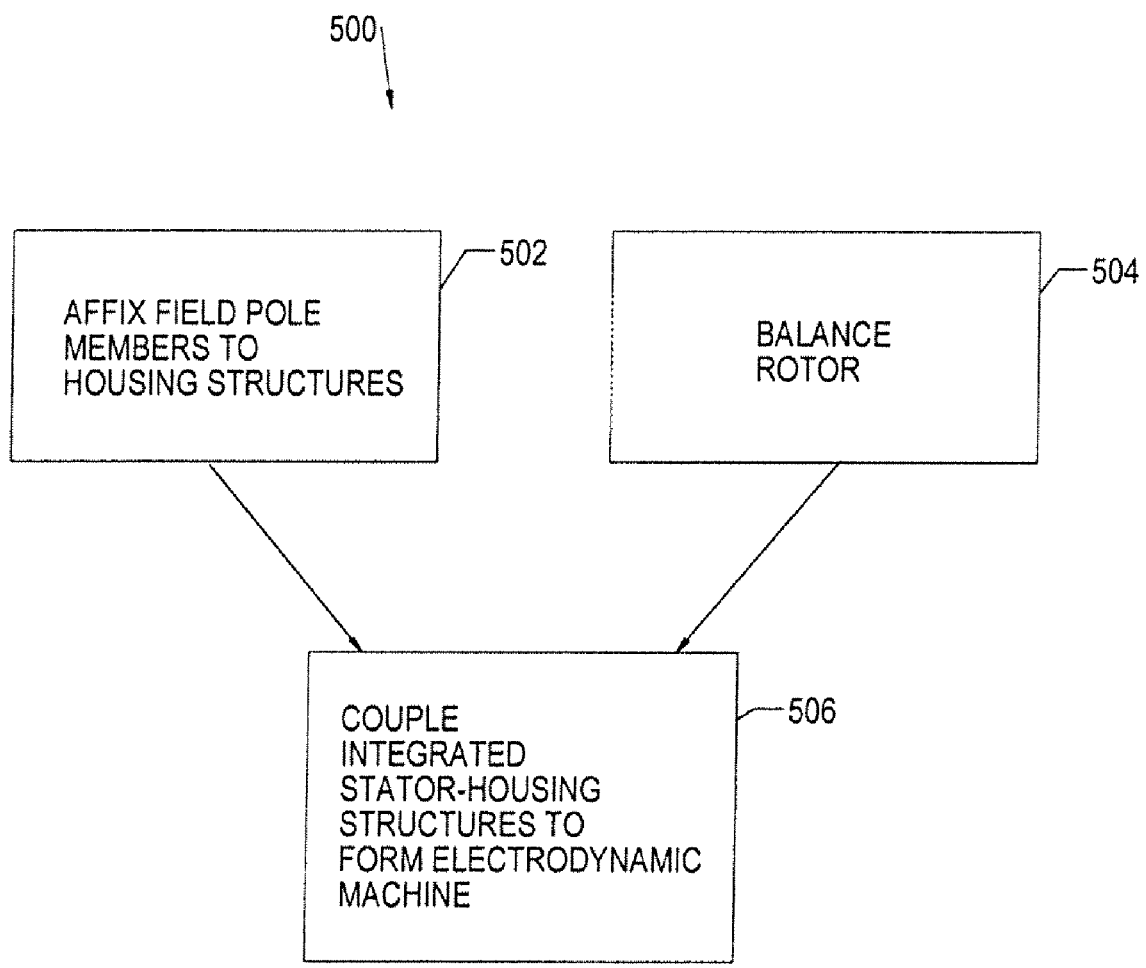
FIG. 5A depicts a flow for constructing an electrodynamic machine in accordance with an embodiment of the invention.

FIG. 5A depicts a flow 500 for constructing an electrodynamic machine in accordance with an embodiment of the invention. Flow 500 affixes field pole members to respective housing structures at 502 to form integrated stator-housing structures. In one embodiment, flow 500 causes a first set of one or more field pole members and a second set of one or more field pole members to be affixed to surfaces (e.g., the surfaces to be facing an axis of rotation) of a first housing structure and a second housing structure, respectively, as is generally depicted in FIG. 3A. In another embodiment, flow 500 causes a first set of one or more field pole members and a second set of one or more field pole members to be formed such that a potting compound forms a first housing structure and a second housing structure, respectively, such as generally described in FIG. 3B. Optionally nested within 502, flow 500 can provide for the formation of straight field pole members to implement a straight flux path between pole faces of the field pole members. Independent from 502, the rotor of the electrodynamic machine can be dynamically tested and balanced 504 prior to coupling the housing structures to-ether, thereby reducing an amount of time to construct an electrodynamic machine. At 506, flow 500 couples the housing structures together to form an enclosure about the rotor that, for example, can include either conical or cylindrical magnets, or both. Optionally nested within 506, flow 500 can provide for securing the rotor, for example, within an assembly fixture to minimize movement of the rotor during assembly of the electrodynamic machine. Further, one or more distances from each of the embedded field pole members to the rotor can be adjusted to provide, for example, an air gap within a predetermined tolerance.

Figure 5B:
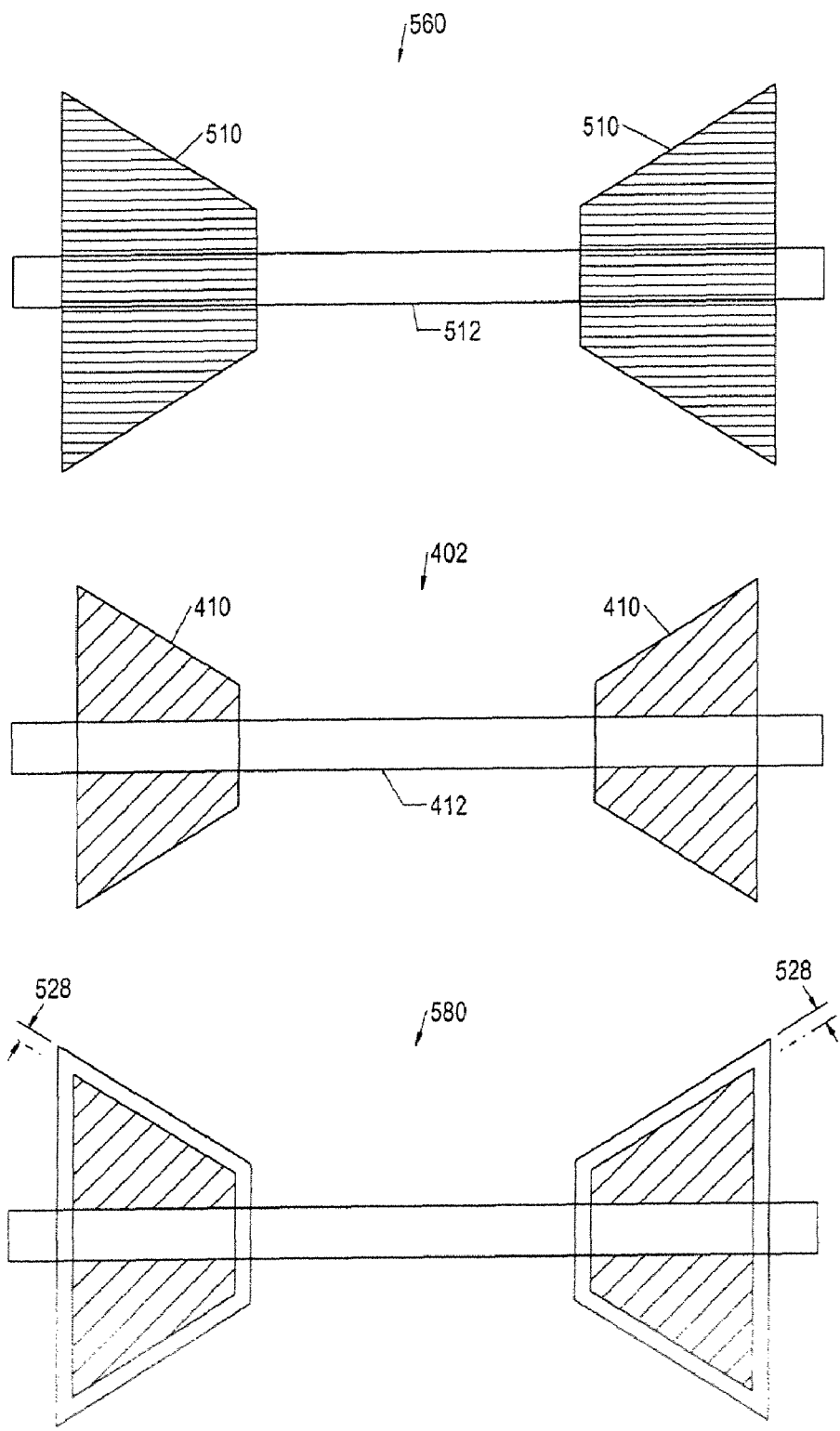
FIG. 5B illustrates the use of a place-holder rotor to establish air gaps during a flow for constructing an electrodynamic machine in accordance with a specific embodiment of the invention.

FIG. 5B illustrates the use of a place-holder rotor to establish air gaps during a flow for constructing an electrodynamic machine in accordance with a specific embodiment of the invention. Place-holder rotor 560 includes a number of place-holder bodies 510 optionally coupled to each other via a shaft-like member 512. In one embodiment, place-holder bodies 510 are formed from non-magnetic material. Flow 500 can implement place-holder bodies 510 to properly position the pole faces of the field pole members prior to integrating rotor 402 into the final assembly. Rotor 402 includes magnets 410 and a shaft 412 of FIG. 4. FIG. 5B depicts a comparison 580 between place-holder rotor 560 and rotor 402. As shown, place-holder bodies 510 are sized larger than magnets 410 to form air gaps 528 for magnets 410 in the final assembly. Accordingly, flow 500 can first form a first integrated stator-housing structure 450 using place-holder rotor 560. For example, place-holder rotor 560 is used to position the active field pole members within a housing structure (e.g., housing structure 320 of FIG. 3A) during which a potting compound affixes those active field pole members to the housing structure. Then, a second integrated stator-housing structure 452 is formed by placing additional active field pole members within another housing structure and positioning those field pole members so that they contact the other portions of the place-holder rotor 560 (i.e., those portions not in contact with the field pole members of first integrated stator-housing structure 450). Next, a potting compound is injected around the additional field pole members to form second integrated stator-housing structure 452. Then, first 450 and second 452 integrated stator-housing structures are separated for substituting place-holder rotor 560 with rotor 402. Subsequent to the substitution of rotor 402, first 450 and second 452 integrated stator-housing structures are assembled to form a final motor assembly. As such, accurate air gaps of the final motor assembly can be formed with relatively precise tolerances.

Figure 6:
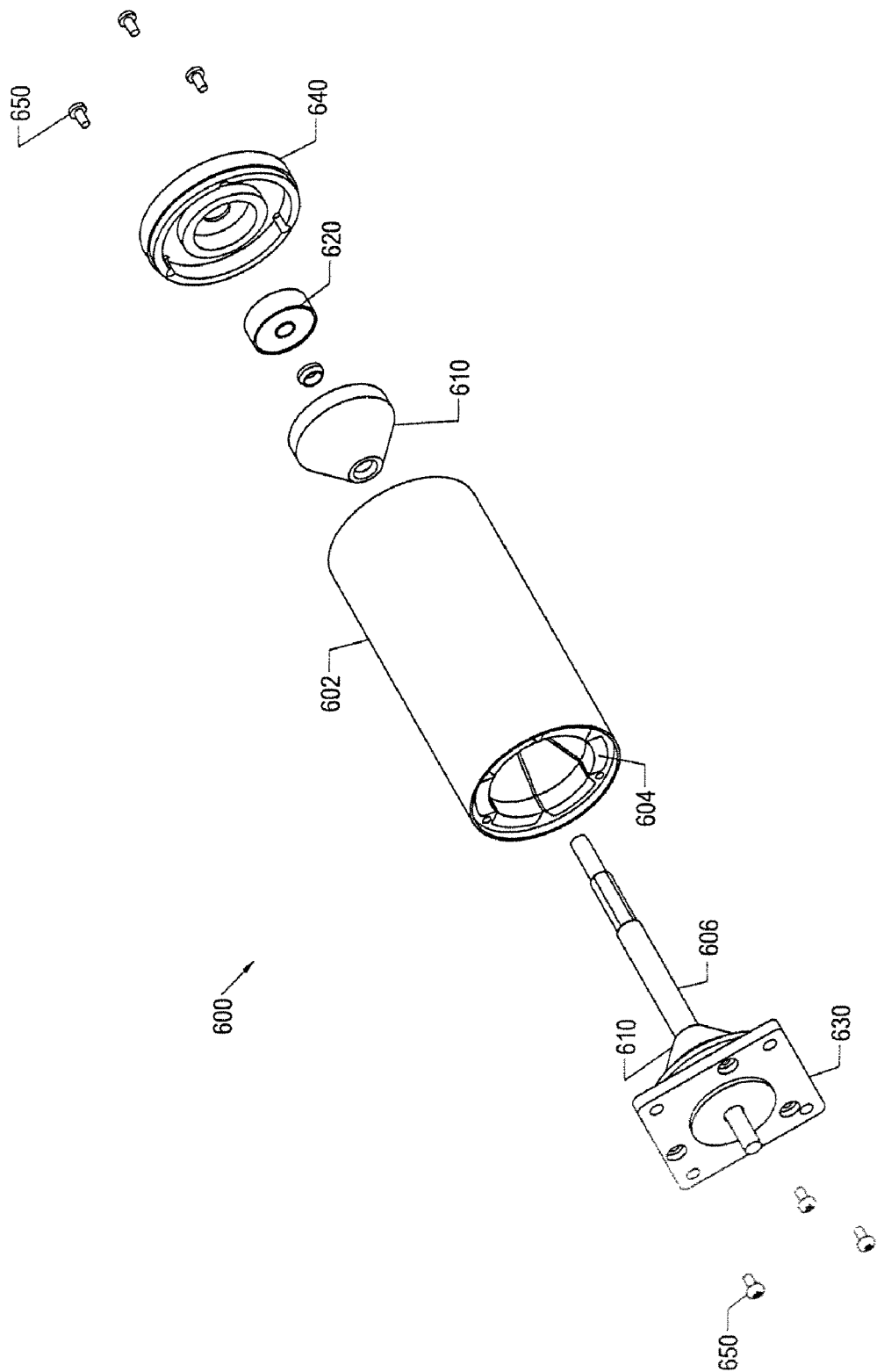
FIG. 6 illustrates the formation of an electrodynamic machine, according to another embodiment of the invention.

FIG. 6 illustrates the formation of an electrodynamic machine according to another embodiment of the invention. FIG. 6 depicts the formation of electrodynamic machine 600 by axially assembling a single (i.e. unitary) housing 602 with a portion of a rotor. Unitary housing 602 provides an enclosure that includes a number of field pole members 604 (active or otherwise) each having pole faces (not shown), where field pole members 604 are arranged to be coaxial about an axis of rotation. Generally, field pole members 604 are affixed (i.e., potted) onto inner surfaces of unitary housing 602 so that the pole faces each confront a magnet, such as a conical magnet. In another embodiment, single housing 602 is omitted and a mold is used to form a continuous material of potting compound as an enclosure. For example, a process similar to FIG. 3B can be used in this case. In this assembly, a partially assembled rotor with shaft 606, magnet 610 and front plate 630 is inserted into the housing 602. Then the second magnet 610, bearing 620 and rear plate 640 are assembled onto the shaft forming an electrodynamic machine.

Figure 7:
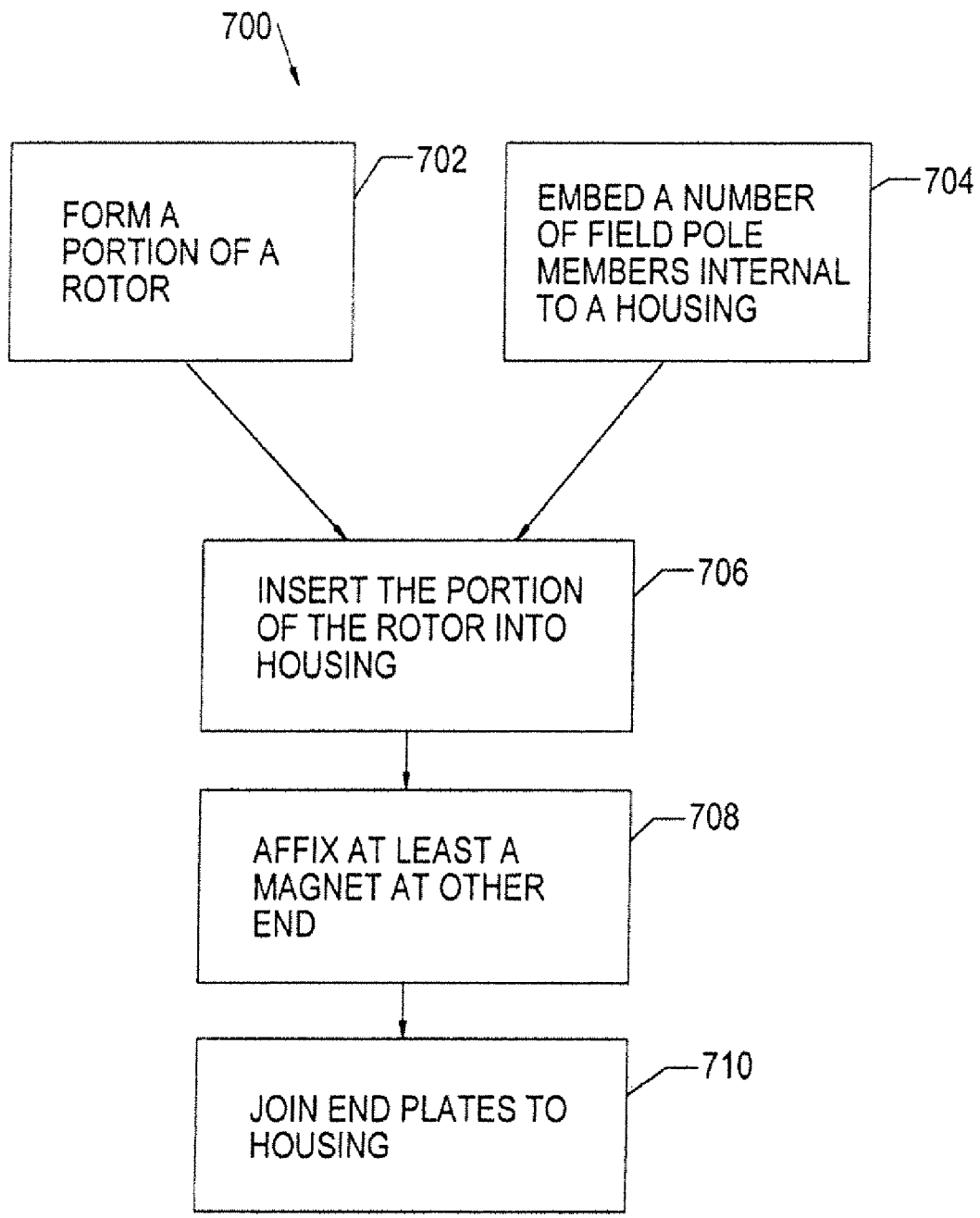
FIG. 7 depicts a flow or constructing an electrodynamic machine in accordance with another embodiment of the invention Like reference numerals refer to corresponding parts throughout the several views of the drawings. Note that most of the reference numerals include one or two left-most digits that generally identify the figure that first introduces that reference number.

FIG. 7 depicts a flow for constructing an electrodynamic machine in accordance with another embodiment of the invention. Flow 700 forms a portion of a rotor at 702. This portion typically includes a front plate, a front bearing, a front magnet, and a shaft. Independent of 702, flow 700 can affix field pole members to the inner surfaces of a housing to form an integrated stator-housing structure constituting an enclosure for the electrodynamic machine. Next, the portion of the rotor is axially inserted into the housing at 706. Then at 708, at least a magnet is affixed (e.g., epoxy-attached) to the other end of the shaft. Also, a rear bearing can be pressed into place with a rear plate being secured to the housing at 710.

In other embodiments, the manufacturing techniques described herein can be applied to any motor or generator that uses a rotor with a relatively smaller spinning diameter near its axial center and a relatively larger spinning diameter near its ends.

A practitioner of ordinary skill in the art requires no additional explanation in making and using the embodiments of the rotor-stator structure described herein but may nevertheless find some helpful guidance by examining the following references in order from most to least preferred: "IEEE 100: The Authoritative Dictionary of IEEE Standard Terms," Institute of Electrical and Electronics Engineers (Kim Breitfelder and Don Messina, eds., 7th ed. 2000, "General Motor Terminology," as defined by the Small Motors and Motion Association ("SMMA") and "Standard Specifications for Permanent Magnet Materials: Magnetic Materials Producers Association ("MMPA") Standard No. 0100-00," International Magnetics Association.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. For example, although the above description of the embodiments are related to a motor, the discussion is applicable to all electrodynamic machines, such as a generator. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. It is intended that the following claims and their equivalents define the scope of the invention.

The invention claimed is:

1. An integrated stator-housing structure for constructing electrodynamic machines, said integrated stator-housing structure, comprising:
   one or more field pole members each having a first pole face and a second pole face configured to confront a conical magnet, said one or more field pole members each having a field pole core being configured to produce a flux path in a direction from said first pole face to said second pole face; and
   a housing structure configured to support said one or more field pole members and a shaft supporting a first conical magnet and a second conical magnet,
   wherein said housing structure is also configured to mate with one or more other housing structures to form an electrodynamic machine.

2. The integrated stator-housing structure of claim 1 wherein said flux path is straight from said first pole face to said second pole face.

3. The integrated stator-housing structure of claim 1 wherein said one or more field pole members further comprise at least one active field pole member having a coil wound about the periphery of one of said one or more field pole members.

4. The integrated stator-housing structure of claim 1 further comprising a fastening means for rigidly affixing said one or more field pole members to said housing structure and/or to encapsulate said one or more field pole members within said housing structure.

5. The integrated stator-housing structure of claim 4 wherein said fastening means comprises a potting compound.

6. The integrated stator-housing structure of claim 1 wherein said housing structure comprises a potting compound.

* * * * *